US012718262B2

(12) United States Patent
Carter

(10) Patent No.: US 12,718,262 B2
(45) Date of Patent: Aug. 25, 2026

(54) SYSTEMS AND METHODS FOR DELIVERING LOYALTY INCENTIVES

(71) Applicant: PAYMENT LOYALTY LIMITED, London (GB)

(72) Inventor: Richard Carter, London (GB)

( * ) Notice: Subject to any disclaimer, the term of this patent is extended or adjusted under 35 U.S.C. 154(b) by 0 days.

(21) Appl. No.: 16/756,789

(22) PCT Filed: Oct. 17, 2018

(86) PCT No.: PCT/GB2018/052990
§ 371 (c)(1),
(2) Date: Apr. 16, 2020

(87) PCT Pub. No.: WO2019/077346
PCT Pub. Date: Apr. 25, 2019

(65) Prior Publication Data

US 2020/0250699 A1 Aug. 6, 2020

(30) Foreign Application Priority Data

Oct. 17, 2017 (GB) ..................................... 1717023

(51) Int. Cl.
*G06Q 30/02* (2023.01)
*G06F 8/65* (2018.01)
(Continued)

(52) U.S. Cl.
CPC ........... *G06Q 30/0238* (2013.01); *G06F 8/65* (2013.01); *G06K 7/0056* (2013.01);
(Continued)

(58) Field of Classification Search
CPC ............. G06Q 30/0238; G06Q 20/202; G06Q 20/204; G06Q 20/206; G06Q 20/209;
(Continued)

(56) References Cited

U.S. PATENT DOCUMENTS 5,923,016 A * 7/1999 Fredregill .......... G06Q 30/0241 235/380
6,634,550 B1 * 10/2003 Walker ................ G06Q 20/387 235/383

(Continued)

FOREIGN PATENT DOCUMENTS

CA 02779774 A1 * 11/2013 ............. G06Q 30/02
WO WO-2014132194 A2 * 9/2014 ......... G06Q 20/4014

OTHER PUBLICATIONS

The Spinning Wheel, Feb. 21, 2017, tekhnologic.wordpress.com, https://tekhnologic.wordpress.com/2017/02/21/the-spinning-wheel/ (Year: 2017).*

(Continued)

*Primary Examiner* — Dipen M Patel
(74) *Attorney, Agent, or Firm* — Endurance Law Group PLC; James R. Yee

(57) ABSTRACT

Methods, system and devices for managing loyalty incentive schemes are provided. In particular, payment terminals are provided that each comprise an electronic screen for displaying information to a user relating to a payment transaction, data input means, including at least one payment instrument interface for interfacing with a customer payment instrument, and at least one telecommunication module. A terminal management server is provided for managing the operation of the payment terminals. An incentive management server is also provided, for managing incentives to be applied at the payment terminals.

16 Claims, 12 Drawing Sheets

(51) Int. Cl.

| | |
|---|---|
| ***G06K 7/00*** | (2006.01) |
| ***G06K 7/10*** | (2006.01) |
| ***G06Q 20/20*** | (2012.01) |
| ***G06Q 20/38*** | (2012.01) |
| ***G06Q 20/40*** | (2012.01) |
| ***G06Q 20/42*** | (2012.01) |
| ***G06Q 30/018*** | (2023.01) |
| ***G06Q 30/0207*** | (2023.01) |
| ***G06Q 30/0226*** | (2023.01) |
| ***G06Q 30/0235*** | (2023.01) |
| ***G06Q 30/0238*** | (2023.01) |
| ***G06T 13/80*** | (2011.01) |

(52) U.S. Cl.

CPC ....... *G06K 7/10366* (2013.01); *G06Q 20/202* (2013.01); *G06Q 20/204* (2013.01); *G06Q 20/206* (2013.01); *G06Q 20/209* (2013.01); *G06Q 20/385* (2013.01); *G06Q 20/40* (2013.01); *G06Q 20/42* (2013.01); *G06Q 30/018* (2013.01); *G06Q 30/0213* (2013.01); *G06Q 30/0233* (2013.01); *G06Q 30/0235* (2013.01); *G06T 13/80* (2013.01)

(58) Field of Classification Search

CPC ...... G06Q 20/385; G06Q 20/40; G06Q 20/42; G06Q 30/018; G06Q 30/0213; G06Q 30/0233; G06Q 30/0235; G06Q 30/0226; G06Q 20/20; G06Q 20/3574; G06F 8/65; G06K 7/0056; G06K 7/10366; G06T 13/80

See application file for complete search history.

(56) References Cited

U.S. PATENT DOCUMENTS

| | | | | |
|---|---|---|---|---|
| 7,835,946 | B2 * | 11/2010 | Goren | G06Q 50/12 705/26.8 |
| 10,037,517 | B1 * | 7/2018 | Chi | G06Q 20/4016 |
| 2002/0019772 | A1 * | 2/2002 | Hillier | G06Q 30/02 705/14.23 |
| 2002/0143626 | A1 * | 10/2002 | Voltmer | G06Q 20/208 705/14.27 |
| 2003/0009382 | A1 * | 1/2003 | D'Arbeloff | G06Q 20/20 705/17 |
| 2003/0191709 | A1 * | 10/2003 | Elston | G06Q 30/0225 705/40 |
| 2003/0208403 | A1 * | 11/2003 | Fisher | G06Q 30/0238 717/117 |
| 2004/0249710 | A1 * | 12/2004 | Smith | G06Q 30/02 705/14.27 |
| 2006/0224449 | A1 * | 10/2006 | Byerley | G06Q 30/0226 705/14.27 |
| 2007/0094085 | A1 * | 4/2007 | Redmond | G06Q 20/382 705/21 |
| 2011/0184823 | A1 * | 7/2011 | Phillips | G06Q 20/206 705/18 |
| 2013/0197987 | A1 * | 8/2013 | Doka | G06Q 30/0229 705/14.28 |
| 2014/0074569 | A1 * | 3/2014 | Francis | G06Q 20/204 705/14.3 |
| 2014/0074658 | A1 * | 3/2014 | Sanchez | G06Q 30/0267 705/26.62 |
| 2014/0172533 | A1 * | 6/2014 | Andrews | G06Q 30/0229 705/14.27 |
| 2014/0229264 | A1 * | 8/2014 | Ross | G06Q 50/01 705/14.27 |
| 2014/0278857 | A1 * | 9/2014 | Bergman | G06Q 30/0211 705/14.13 |
| 2015/0278845 | A1 * | 10/2015 | Sorem | G06Q 20/202 705/14.25 |
| 2017/0286085 | A1 | 10/2017 | Steshenko et al. | |
| 2018/0005200 | A1 * | 1/2018 | Hajji | G07G 1/0009 |
| 2018/0174180 | A1 * | 6/2018 | Chopra | G06Q 30/0238 |

OTHER PUBLICATIONS

David Intersimone, Lesson 8—Using Image and Animation Effects, Jun. 21, 2012, Embarcadero Technologies, Inc., http://firemonkey.borlandforum.com/impboard/attach/0000143970/e_learning_series_win_mac_development_coursebook_lesson8.pdf (Year: 2012).*

Phylicia Joannis, Best POS Software with Built in Loyalty Solutions, Aug. 12, 2015, maverick, https://www.merchantmaverick.com/best-pos-software-with-built-in-loyalty-solutions/ (Year: 2015).*

Create a Digital Loyalty Program for Your Business, Oct. 11, 2017, belly, https://www.bellycard.com/ (Year: 2017).*

International Search Report and Written Opinion (International Application No. PCT/GB2018/052990); Mail Date: Aug. 1, 2019; 9 pages.

* cited by examiner

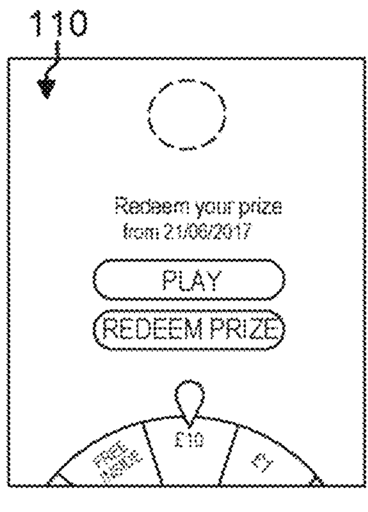
Figure 7
Figure 8
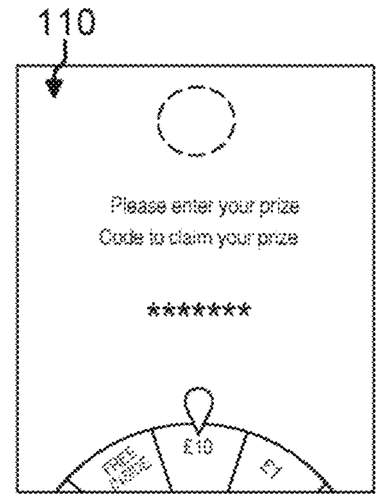
Figure 9
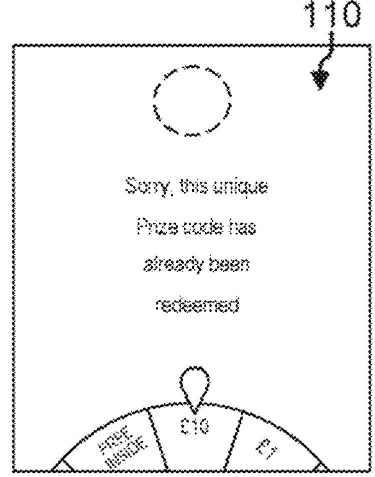
Figure 10
110
"CHEAPEST MAIN COURSE"
from 21/06/2017
Please hand back the terminal to apply the prize
APPLY PRIZE
£10
£1
Figure 11
Figure 12

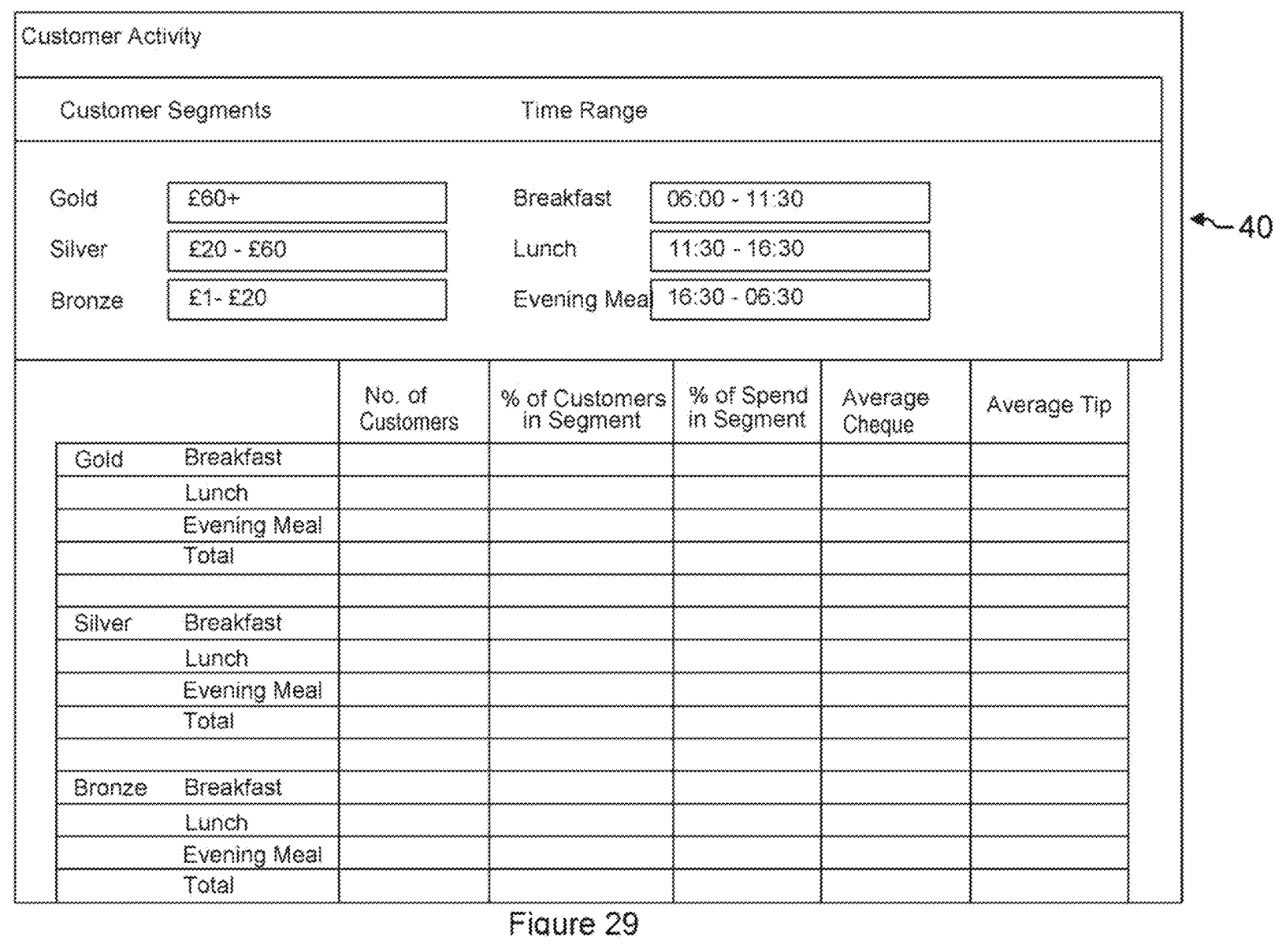

40

Customer Activity

| Customer Segments | | Time Range | |
|---|---|---|---|
| Gold | £60+ | Breakfast | 06:00 - 11:30 |
| Silver | £20 - £60 | Lunch | 11:30 - 16:30 |
| Bronze | £1- £20 | Evening Meal | 16:30 - 06:30 |

| | | No. of Customers | % of Customers in Segment | % of Spend in Segment | Average Cheque | Average Tip |
|---|---|---|---|---|---|---|
| Gold | Breakfast | | | | | |
| | Lunch | | | | | |
| | Evening Meal | | | | | |
| | Total | | | | | |
| | | | | | | |
| Silver | Breakfast | | | | | |
| | Lunch | | | | | |
| | Evening Meal | | | | | |
| | Total | | | | | |
| | | | | | | |
| Bronze | Breakfast | | | | | |
| | Lunch | | | | | |
| | Evening Meal | | | | | |
| | Total | | | | | |

Figure 29

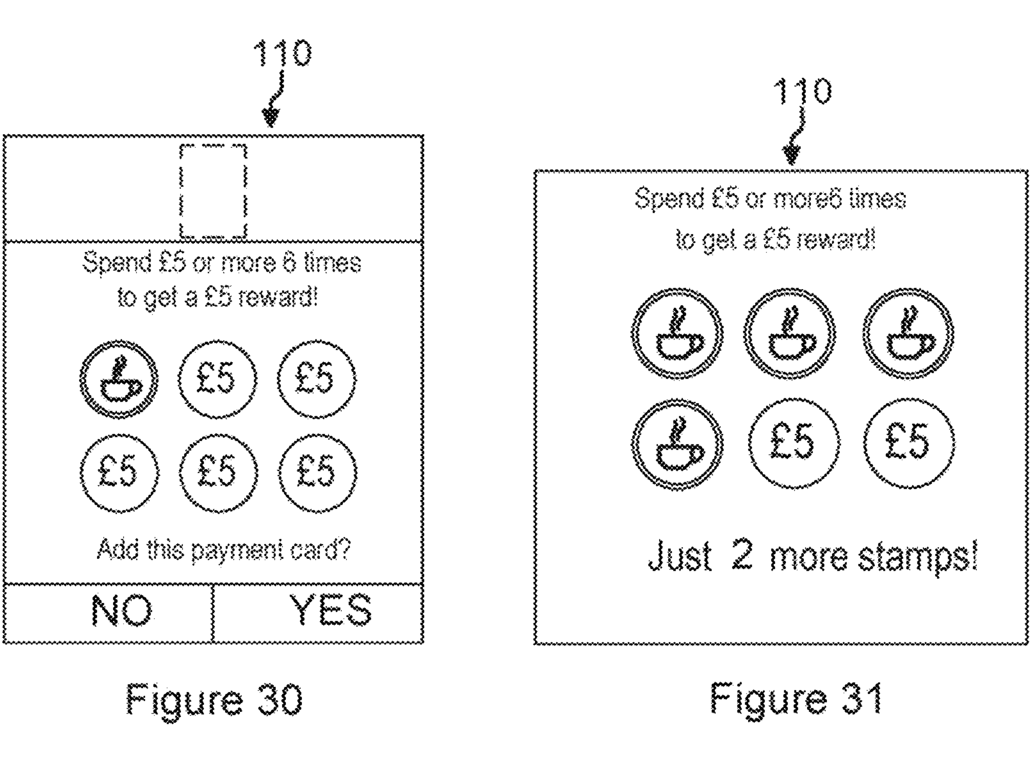
Figure 30
Figure 31
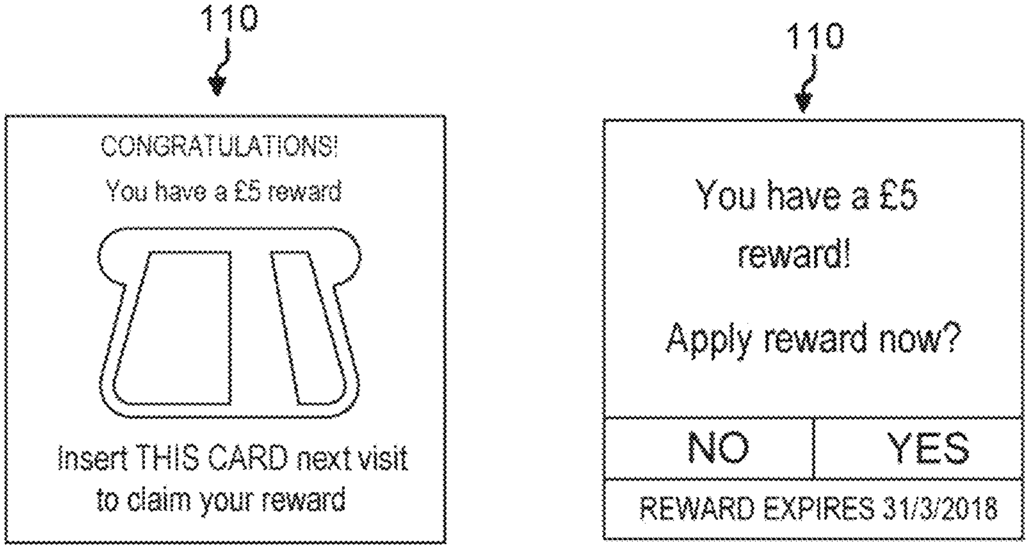
Figure 32
Figure 33

SYSTEMS AND METHODS FOR DELIVERING LOYALTY INCENTIVES

CROSS-REFERENCE TO RELATED APPLICATIONS

This application is a national phase application of International Patent Application No. PCT/GB2018/052990, filed Oct. 17, 2018, which claims priority to GB Patent Application No. 1717023.4, filed Oct. 17, 2017, the disclosures of which are hereby incorporated by reference in their entirety.

FIELD OF THE INVENTION

The present invention relates to a payment system. In particular, the present invention relates to an electronic payment system that is suitable for managing loyalty incentives provided as part of a loyalty incentive scheme. The invention also relates to payment terminals of that payment system, and a method of managing loyalty incentives and payment terminals for that payment system.

BACKGROUND TO THE INVENTION

Loyalty incentive schemes are onerous to operate. Those that use a physical loyalty or stamp card, require that a customer carries such physical media with them at all times. This is so that such physical media may be presented to a retailer as evidence of a previous purchase.

Loyalty cards also need to be registered with the electronic systems of the retailer to register purchases and so log which loyalty rewards a customer is entitled to. For example, once it is determined that a particular customer has made a sufficient number of purchases to entitle them to a discount for products or services procured by the retailer, those discounts either needs to be applied at time of next purchase or otherwise be sent to an address of the customer for subsequent redemption. Many customer are unwilling to spend the time signing on to a loyalty incentive scheme, especially those that require that the customer provide additional customer details such as an address. Typically, each retail outlet offers its own loyalty card or stamp card, and so a customer is soon burdened with carrying many different loyalty cards.

In an attempt to address these problems, loyalty incentive schemes are being provided via mobile applications. These are typically run on a customers smartphone, and have the benefit of the customer not needing to carry many individual physical loyalty cards. However, it can be administratively onerous for customers to download, execute and correctly operate many mobile applications on their own mobile phone. Every retailer may have their own application and so a customers mobile device may quickly run out of data storage. Additionally, some customers may not have access, or the technical nouns to operate a smartphone to use such loyalty incentive schemes effectively.

Furthermore, certain retailers who may wish to operate a customised loyalty incentive scheme particular to their goods and services may not have the time, resources or the technical capability to prepare a suitable electronic loyalty incentive scheme—especially one that works in conjunction with their existing POS systems.

Nonetheless, it can be desirable to offer customers with an incentive to return to a retailers premises through the use of loyalty based rewards. Furthermore, it is desirable to engage customers through the use of a loyalty incentive scheme, and avoid burdening customers with supporting the technical components of the loyalty incentive scheme.

It is against this background that the present invention has been conceived.

SUMMARY OF THE INVENTION

According to a first aspect of the present invention there is provided an electronic payment system. Ideally, the system is suitable for managing a loyalty incentive scheme.

Preferably, the system comprises a plurality of payment terminals.

At least one of the payment terminals may comprise at least one of:

- an electronic screen for displaying information to a user relating to a payment transaction;
- data input means, including at least one payment instrument interface for interfacing with a customer payment instrument, such as a credit card, and receiving payment instrument data therefrom; and
- at least one telecommunication module.

Preferably, the system comprises a management server. The management server may comprise a terminal management server for managing the operation of the payment terminals. The management server may comprise an incentive management server for managing incentives to be applied at the payment terminals.

Naturally, it will be understood that the management server, or other servers referred to herein, may not necessarily be in the form of a single physical machine. The term "server" may encompass, for example, a distributed or "cloud" computing service, engine or platform.

Preferably, at least one of the payment terminals is arranged download an application for execution by the respective payment terminal. Ideally, the application is downloaded by communicating, via the at least one telecommunication module, with, for example, a management server. The location from which the application is downloaded may be the terminal management server, or may be an application server similar to the Apple® Appstore, or Google® Play Store.

Advantageously, this allows payment terminals to operate in an updatable and improved manner compared to prior-known payment terminals. The downloading and execution of the application confers functionality to the payment terminal that it would otherwise not have, and herein, reference to operation of the terminal is generally operation under control of the downloaded and executed application. This advantage is further improved through the provision of a wireless telecommunication module which enhances the ability to change, reconfigure and update the payment terminal OTA ("over-the-air").

Preferably, the executed application configures the payment terminal to:

- receive, via the data input means, a value of a first customer purchase to be made during a first customer visit to a retailer;
- determine a loyalty incentive, ideally in dependence on the value of the first customer purchase; this determination may be made by sending a loyalty incentive request (e.g. including the value of the first customer purchase) to the management server, and receiving back from it an appropriate loyalty incentive;
- determine a unique identifier associated with the loyalty incentive; this determination may be made by sending a UID request to the management server, and receiving back from it an appropriate unique identifier;

- securely conduct a payment transaction with a payment server, via the at least one payment instrument interface, to conclude the first customer purchase;
- display, on the electronic screen, successful conclusion of the first customer purchase; and/or
- transmit, via the at least one telecommunication module, the loyalty incentive and/or the associated unique identifier between the incentive management server, and the payment terminal.

Preferably, the executed application configures the (or another) payment terminal, for example at a later time such as a second customer visit and/or at a different retailer, to:

- receive, via the data input means, the unique identifier. Ideally, this is provided during a second customer visit to the retailer, which may be a different retailer visited by the customer during the second visit;
- transmit, via the at least one telecommunication module, a redemption request to the incentive management server. Ideally, the redemption request includes the unique identifier provided during the second customer visit to the retailer;
- receive, via the at least one telecommunication module, a redemption response from the incentive management server, the redemption response comprising the loyalty incentive associated with the unique identifier;
- display, via the electronic screen, an initial value of a second customer purchase to be made during the second customer visit to the retailer;
- apply the loyalty incentive received as part of the redemption response, ideally against the initial value;
- display, via the electronic screen, a discounted value of the second customer purchase;
- conclude the second customer purchase, optionally by securely conducting a payment transaction with a payment server, (e.g. via the at least one payment instrument interface);
- display, on the electronic screen, successful application of the loyalty incentive; and/or
- display, on the electronic screen, successful conclusion of the second customer purchase.

Components of payment terminals, such as the electronic screen, data input means and telecommunication module(s) are ideally integrated with one another within a hand-held payment terminal. However, in alternatives, the components may be separated, and communicatively linked to one another. For example, the electronic screen of the payment terminal may be physically separated from the data input means. Additionally, the payment terminal may comprise a plurality of electronic screens, and each may be arranged to display different types of information. For example, one screen may provide information relating to a payment transaction, and another screen may provide information relating to provision, status and redemption of loyalty incentives.

It is generally advantageous for the management server to be separate from the payment terminal. This allows the management server to centrally manage a plurality of payment terminals, for example allowing the functions of determining, display and redeeming loyalty incentive to be spread across different payment terminals.

The executed application may configure the payment terminal to determine a loyalty incentive in dependence on the value of the first customer purchase, for example providing a loyalty incentive only if the value of the first customer purchase is above a predetermined value. Advantageously, if the value of the first customer purchase is below a predetermined value, this prevents unnecessary steps (e.g. in computation or communication) being taken.

It will be understood that the payment terminal can be configured to conduct the payment transaction prior to determining the loyalty incentive and/or determining a unique identifier associated with the loyalty incentive.

The executed application may configure the payment terminal to determine a loyalty incentive and/or determine a unique identifier associated with the loyalty incentive via communication with the incentive management server. In such circumstance, the payment terminal may be configured to receive the loyalty incentive and/or associated unique identifier from the incentive management server. In this case, it may not necessarily be essential for the payment terminal to transmit the loyalty incentive and/or associated unique identifier to the incentive management server for storage. For example, the payment terminal may be configured by the application to transmit a unique identifier to the incentive management server, and in response, receive from the incentive management server, the loyalty incentive. The unique identifier itself may be derived from the payment instrument used to conduct a payment transaction.

Thus, generalising the above, the executed application may configure the payment terminal to communicate, via the at least one telecommunication module, with incentive management server so that at least one of the loyalty incentive and associated unique identifier is communicated between the payment terminal and the incentive management server.

Nonetheless, it is generally preferred that the determination of the loyalty incentive is dependent on the successful conclusion of the first customer purchase.

It will be understood that one or more intermediate customer visits may be needed between the first and second customer visits before it is appropriate to allow redemption of the loyalty incentive. For example a retailer may wish to encourage multiple visits or transactions prior to providing a loyalty incentive. For example, the loyalty incentive can be in the form of a free product, such as a cup of coffee, and redemption of this incentive is conditional on the purchase of a predetermined number of similar products (e.g. 5 cups of coffee). Similarly, it may be desirable for other conditions to be met prior to allowing redemption—e.g. purchases must be made over a corresponding number of visits, or must take place within a particular period.

In view of this, a loyalty incentive may comprise a set of condition parameters that are to be met prior to valid redemption of that loyalty incentive. Moreover, the incentive management server may be configured to store loyalty incentives, associated unique identifiers, and associated sets of condition parameters, and update the latter in response to those conditions being met. Additionally, the incentive management server may be configured to communicate the status of condition parameters—thereby providing feedback to a customer about the progress of their ability to redeem a loyalty incentive.

In complement, the executed application may configure the payment terminal to:

- during an intermediate customer visit to the retailer, receive, via the data input means, the unique identifier associated with a loyalty incentive;
- transmit, via the at least one telecommunication module, a status check request to the incentive management server, the status check request including the unique identifier;
- receive, via the at least one telecommunication module, a status check response from the incentive management server, the status check response comprising the status of the condition parameters associated with the unique identifier; and display, via the electronic screen, a representation of the status of the condition parameters associated with the unique identifier.

Preferably, the displayed representation of the status of the condition parameters associated with the unique identifier comprises a graphical artefact of the conditions that have and/or have not been met. Ideally, the presence or absence of said graphical artefacts are indicative of the conditions being met. Moreover, if the condition parameters comprise a numerical element, then that numerical element may be represented graphically.

For example, a number of graphical "stamp" artefacts may be displayed, with the number of artefacts displayed corresponding to the number of purchases made by a customer over preceding visits. Alternatively, the graphical artefacts could represent the extent to which an image of a coffee cup has been filled, with an image of a partly-full coffee cup representing some (but not all) of the condition parameters being met, and a full coffee cup representing all of the condition parameters being met, and so the ability of the loyalty incentive to be redeemed.

Naturally, the executed application may further configure the payment terminal to:

during an intermediate customer visit to the retailer, receive, via the data input means, the unique identifier associated with a loyalty incentive;

securely conduct a payment transaction with the payment server, via the at least one payment instrument interface, to conclude an intermediate customer purchase;

transmit, via the at least one telecommunication module, a status update request to the incentive management server, the status update request including the unique identifier;

receive, via the at least one telecommunication module, a status update response from the incentive management server, the status update response comprising an updated status of the condition parameters associated with the unique identifier; and/or display, via the electronic screen, a representation of the status of the condition parameters associated with the unique identifier.

Preferably, determining the loyalty incentive in dependence on the value of the first customer purchase comprises:

choosing one of a plurality of predetermined sets of potential loyalty incentives, the plurality of predetermined sets of potential loyalty incentives being preloaded into the application downloaded from the terminal management server; and/or executing an animation sequence on the electronic screen during which each member of the chosen set of potential loyalty incentives are represented on the electronic screen, the animation sequence concluding with one of those members being identified by a respective representation as the determined loyalty incentive.

Ideally, the animation sequence displays only a sub-set of the representations of the potential loyalty incentives on the electronic screen at any one time.

Preferably, the animation sequence comprises moving the representations of the chose set of potential loyalty incentives along a movement path starting at a first screen boundary, and ending at a second screen boundary. The movement path may be curved.

The executed application may further configure the respective payment terminal to:

determine, during the first customer visit to the retailer, a validity parameter associated with the determined loyalty incentive; and transmit the validity parameter together with the loyalty incentive and associated unique identifier to the incentive management server for storage; wherein, during the second customer visit to the retailer, application of the loyalty incentive is dependent on the validity parameter.

The executed application may configure the payment terminal to determine the validity parameter via communication with the incentive management server. In such circumstances, the payment terminal may be configured to receive the validity parameter from the incentive management server. In this case, it may not necessarily be essential for the payment terminal to transmit the validity parameter to the incentive management server for storage. For example, the payment terminal may be configured by the application to transmit a unique identifier to the incentive management server, and in response, receive from the incentive management server, the validity parameter.

Thus, generalising the above, the executed application may configure the payment terminal to communicate, via the at least one telecommunication module, with incentive management server so that at least one of the: loyalty incentive, associated unique identifier, and associated validity parameter is communicated between the payment terminal and the incentive management server.

Preferably, the validity parameter comprises an expiry date, and application of the loyalty incentive is dependent on the date of redemption not being after the expiry date.

Preferably, the validity parameter comprises a minimum spend threshold, and application of the loyalty incentive is dependent on the initial value of the second customer purchase not being lower than the minimum spend threshold.

Preferably, an authorisation code is loaded into the application, the executed application further configuring the respective payment terminal to issue an authorisation notification for notifying an authorised user, such as retailer staff, to provide the authorisation code, application of the loyalty incentive being dependent on the correct authorisation code being provided via the data input means in response to the authorisation notification.

Preferably, the loyalty incentive comprises a numerical parameter, such as a value or percentage, the discounted value of the second customer purchase is automatically calculated by the executed application.

Preferably, the loyalty incentive comprises a non-numerical parameter, such as an instruction, the executed application is arranged to display to an authorised user the non-numerical parameter and in response is arranged to receive from the authorised user, via the data input means, a numerical value associated with the non-numerical parameter.

Preferably, the payment terminals each comprise a token generator, such as a printer, for issuing a physical token, the executed application further configuring the respective payment terminal to issue a physical token in response to successful conclusion of the first customer purchase, the physical token bearing a representation of the unique identifier.

Preferably, the issued token further bears a representation of at least one of the loyalty incentive and a validity parameter.

Preferably, determining (e.g. during the first customer visit) and/or providing (e.g. during an intermediate or the second customer visit) of the unique identifier associated with the loyalty incentive comprises: interfacing, via the at least one payment instrument interface, with a customer payment instrument to receive therefrom a payment instrument identifier, such as a card number, the unique identifier being generated by applying a function on the payment instrument identifier.

Preferably, each payment terminal comprises a payment terminal identifier, and determining the unique identifier associated with the determined loyalty incentive comprises generating the unique identifier by applying a function on the payment terminal identifier.

Preferably, the data input means comprises at least one of a virtual keypad displayed on the electronic screen of the payment terminal, and a physical keypad. Preferably, receiving the value of the first customer purchase comprises receiving a user interaction with at the at least one keypad to provide the value to the payment terminal.

Ideally, the at least one payment instrument interface comprises at least one of a payment card chip reader, a payment card slot and a contactless payment transceiver.

Preferably, at least one of the payment terminals is arranged to issue an update request to the terminal management server, and in response receive an update of the application to be executed.

Preferably, the update request is issued periodically from each respective payment terminal to the terminal management server and/or in response to an update command issued by an authorised user of the payment terminal.

Preferably, the terminal management server is configured to maintain a plurality of retailer user accounts, each retailer user account permitting secure communication with a set of payment terminals belonging to an owner of a respective retailer user account so as to download and/or update a customised version of the application to be executed on each payment terminal of that set.

Preferably, the customised version of the application may comprise at least one of:

- images, such as retailer logos and/or messages to be displayed and/or printed;
- one or more loyalty incentive determination parameters;
- one or more predetermined sets of potential loyalty incentives;
- one or more unique identifier determination parameters; and
- one or more authorisation codes;

chosen and/or specified by the owner of the respective retailer user account.

Preferably, the terminal management server is arranged to establish a secure connection with a retailer computing device, and serve thereto a user interface via which an owner of a retailer user account can choose and/or specify at least one of:

- images, such as retailer logos and/or messages to be displayed and/or printed;
- one or more loyalty incentive determination parameters;
- one or more predetermined sets of potential loyalty incentives;
- one or more unique identifier determination parameters; and
- one or more authorisation codes;

Preferably, the incentive management server is configured to maintain a plurality of retailer user accounts, each retailer user account:

- permitting secure communication with a set of payment terminals belonging to an owner of a respective retailer user account; and
- granting access to data previously transmitted by payment terminals of that set to the incentive management server, and stored thereat.

Preferably, the incentive management server is arranged to establish a secure connection with a retailer computing device, and serve thereto a user interface via which an owner of a retailer user account can view the data previously transmitted by the set of payment terminals belonging to that owner.

Preferably, the user interface is arranged to present the data corresponding to at least one of:

- time, number and/or value of loyalty incentives issued;
- time, number and/or value of loyalty incentives redeemed; and
- time and/or number of returning customers.

Preferably, the data is presented via the user interface in a visual form such as:

- a bar graph or chart, with time as an axis; and/or
- with indicia or colours indicating relative values, such as red for low, green for high, up arrow for increase, down arrow for decrease.

Preferably, the payment system further comprises a retailer computing device arranged to communicate with at least one of the terminal management server and the incentive management server.

Preferably, the payment system further comprises a payment server arranged to communicate with at least one of the payment terminals for securely conducting a payment transaction therewith.

According to a second aspect of the present invention there is provided a payment terminal for use in conjunction with a system according to the first aspect of the present invention.

According to a third aspect of the present invention there is provided a method comprising at least one of:

- downloading an application from a terminal management server to at least one of a plurality of payment terminals; and
- executing each application on a respective payment terminal to configure each respective payment terminal to:
  - receive a value of a first customer purchase to be made during a first customer visit to a retailer;
  - determine a loyalty incentive, ideally in dependence on the value of the first customer purchase;
  - determine a unique identifier associated with the loyalty incentive;
  - securely conduct a payment transaction to conclude the first customer purchase;
  - transmit the loyalty incentive and associated unique identifier to an incentive management server for storage;
  - receive the unique identifier provided during a second customer visit to the retailer;
  - transmit a redemption request to the incentive management server, the redemption request including the unique identifier provided during the second customer visit to the retailer;
  - receive a redemption response from the incentive management server, the redemption response comprising the loyalty incentive associated with the unique identifier;
  - display an initial value of a second customer purchase to be made during the second customer visit to the retailer;
  - apply the loyalty incentive received as part of the redemption response against the initial value;
  - display a discounted value of the second customer purchase; and/or
  - conduct a secure payment transaction to conclude the second customer purchase.

It will be understood that features and advantages of different aspects of the present invention may be combined or substituted with one another where context allows.

For example, the features of the system described in relation to the first aspects of the present invention may be provided as part of the payment terminal of the second aspect, and/or the method described in relation to the third aspect of the present invention.

Furthermore, such features may themselves constitute further aspects of the present invention. For example, the features of the application, the terminal management server, and the incentive management server may themselves constitute further aspects of the present invention.

BRIEF DESCRIPTION OF THE DRAWINGS

In order for the invention to be more readily understood, embodiments of the invention will now be described, by way of example only, with reference to the accompanying drawings in which:

FIGS. 7 to 12 are various screenshots of the graphical user interface of the payment terminal of FIG. 3;

FIGS. 24 to 29 are screenshots of a graphical user interface served by a management server of the payment system of FIG. 1, the graphical user interface permitting the configuration of payment terminals of the payment system of FIG. 1 and/or displaying data transmitted by those payment terminals to the management server;

FIGS. 30 to 33 are various screenshots of an alternative graphical user interface that may run on the payment terminal of FIG. 3.

SPECIFIC DESCRIPTION OF THE PREFERRED EMBODIMENTS

Figure 1:
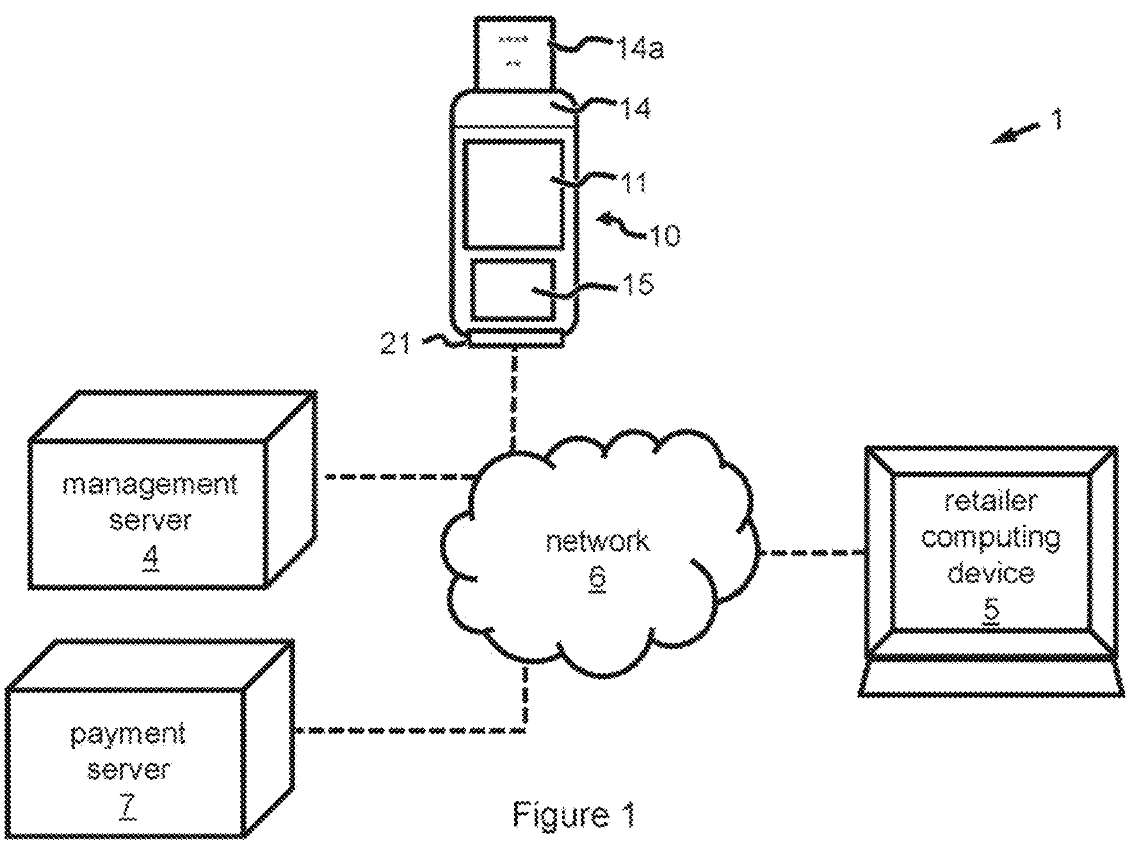
FIG. 1 is a schematic view of a payment system according to various embodiments of the present invention.

The system 1 comprises a plurality of payment terminals 10, one of which is explicitly depicted in FIG. 1. The system 1 further comprises a network 6, a retailer computing device 5, a management server 4, and a payment server 7.

The payment terminals 10, the retailer computing device 5, the management server 4, and the payment server 7 are communicatively linked via the network 6. The management server 4 is arranged to act firstly as a terminal management server for managing the operation of the payment terminals 10, and secondly as an incentive management server for managing incentives to be applied at the payment terminals 10. However, in alternatives a separate terminal management server and incentive management server may be provided.

Figure 2:
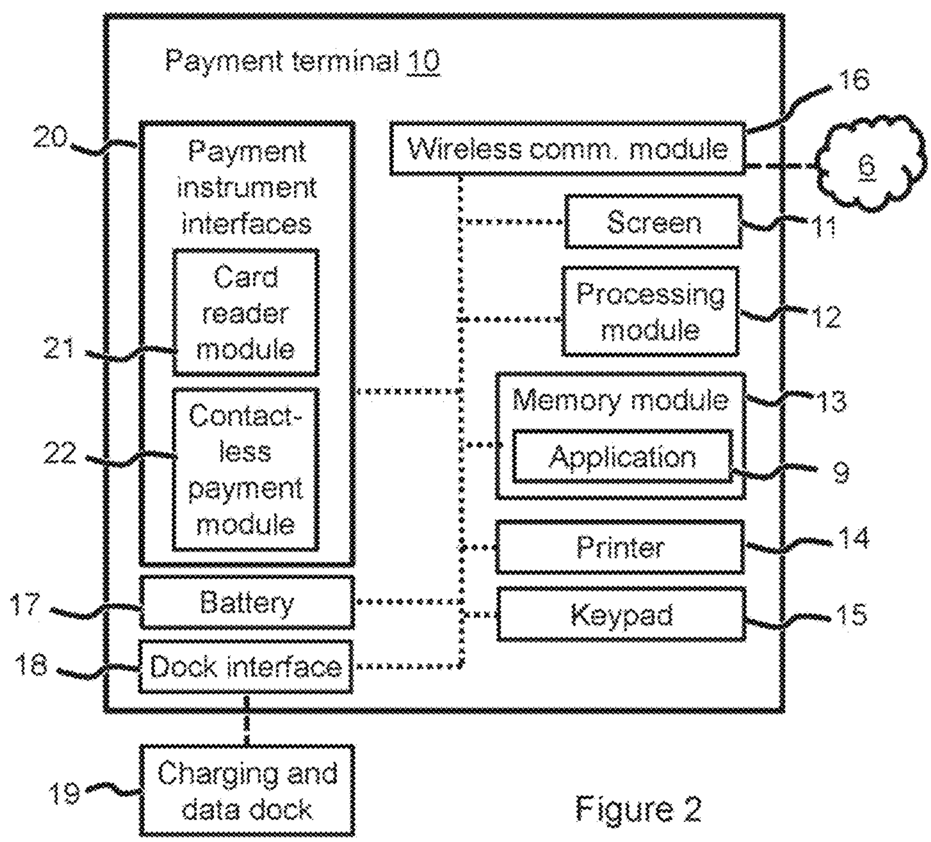
FIG. 2 is a block diagram of a payment terminal of the payment system of FIG. 1.

Referring to FIG. 2, the payment terminal 10 comprises a set of payment instrument interfaces 20, including a card reader module 21 and a contactless payment module 22. The payment terminal 10 further comprises a wireless communication module 16 via which the payment terminal 10 is communicatively connected to the network 6. The payment terminal 10 further comprises a screen 11, a processing module 12, a memory module 13, a printer 14, a keypad 15, a battery 17, and dock interface 18.

As is relatively well known in the technical field associated with payment terminals, the electronic screen 11 is arranged to display information to user regarding relating to a payment transaction, and may provide the user with instructions for operation of the payment terminal 10—for example, prompting the user to provide an input to execute a particular function. Additionally, the electronic screen 11 is a touch-sensitive electronic screen, and so is able to receive a user input therefrom. Nonetheless, a physical keypad 15 is provided as a further data input means. The payment instrument interfaces also constitute further data input means as they are arranged to interface with a customer payment instrument and transmit and receive data therefrom for the purposes of conducting a payment transaction and furthermore to operate the behaviour of the payment terminal 10 in general as will be described.

The dock interface 18 is arranged to connect with a charging and data dock 19 via which the payment terminal can recharge the battery 17 and transmit and receive data from the network 6. Accordingly, when the payment terminal 10 is docked, it is provided with a telecommunication means additional to that of the wireless communication module 16. Referring back to FIG. 1, the printer 14 of the payment terminal 10 is arranged to print a paper receipt and/or voucher 14*a* in use of the payment terminal 10 as will be described.

Referring back to FIG. 2, the payment terminal 10 is arranged to communicate with management server 4 to download from it an application 9 for subsequent execution by the payment terminal 10. The downloaded application 9 is stored within the memory module 13 and executed via the processing module 12 to control the other components of the payment terminal 10. This includes controlling the electronic screen 11 to display a graphical user interface for displaying information to an operating user and also for receiving inputs from the operating user.

Figures 3, 4, 5, 6:
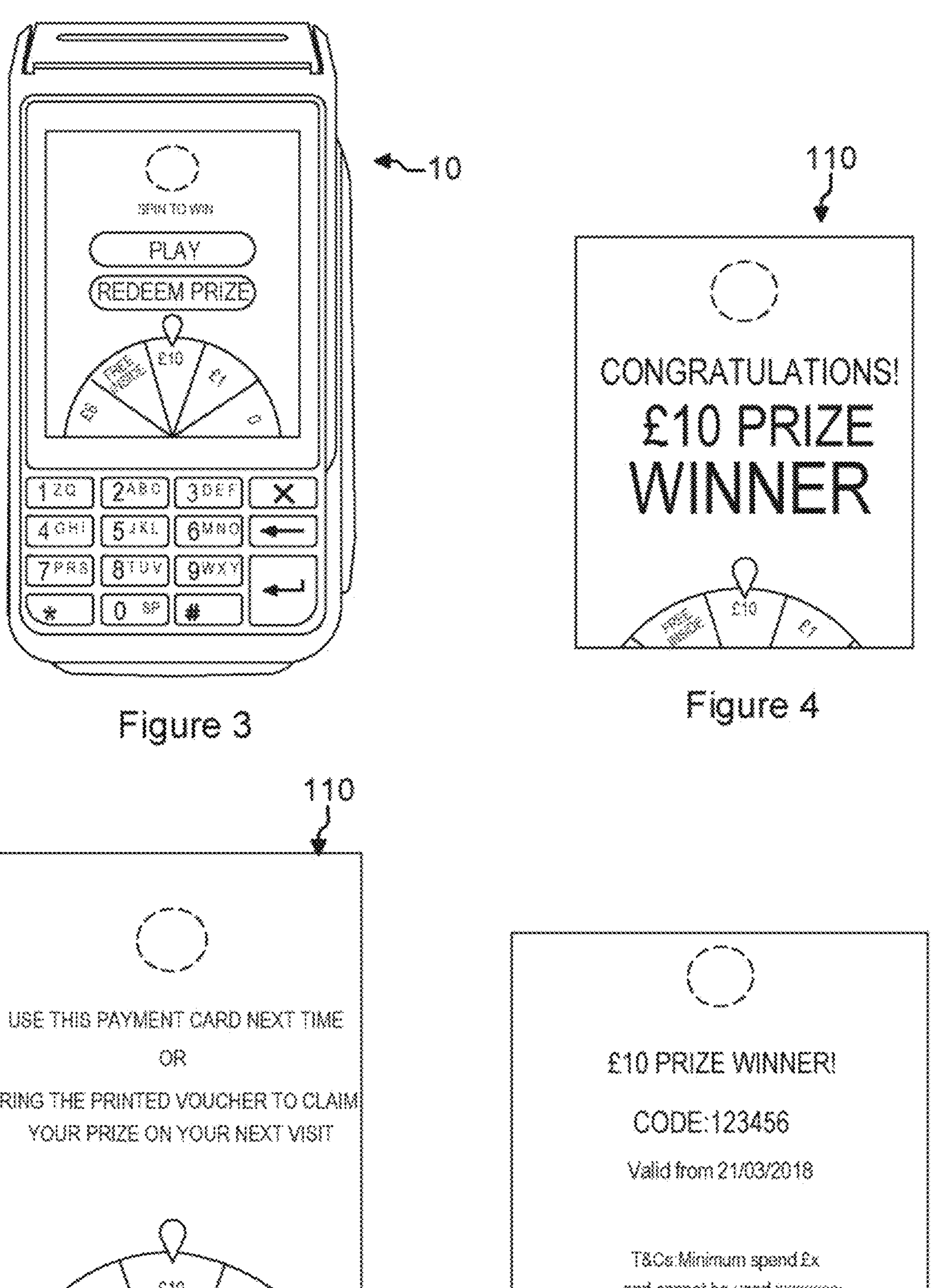
FIG. 3 is an overhead view of a payment terminal of the payment system of FIG. 1, the payment terminal comprising an electronic screen via which there is displayed a graphical user interface running on the payment terminal.
FIG. 4 is a screenshot of the graphical user interface of the payment terminal of FIG. 3, the graphical user interface displaying a loyalty incentive determined by the payment terminal.
FIG. 5 is a screenshot of the graphical user interface of the payment terminal of FIG. 3, the graphical user interface displaying redemption instructions.
FIG. 6 is a voucher printed by a printer of the payment terminal of FIG. 3.
Figure 13:
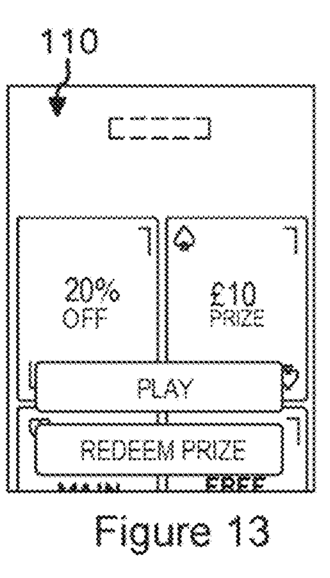
FIGS. 13 to 24 are various screenshots of an alternative graphical user interface that may run on the payment terminal of FIG. 3.

FIG. 3 is an overhead view of a payment terminal 10 of the payment system of FIG. 1, the payment terminal comprising an electronic screen 11 via which there is displayed a graphical user interface 110 running on the payment terminal 10, the graphical user interface and the operation of the payment terminal 10 being controlled by the application 9. Various screenshots of this graphical user interface 110 are shown in FIGS. 4, 5 and 7 to 12, and screenshots of an alternative graphical user interface 110, as generated by an alternative application is shown in FIGS. 13 to 24.

The present embodiment is tailored to the seated food and beverage industry, but it will be understood that alternative embodiments may be provided by retailers of other goods and services.

In general terms, the executed application 9 is arranged to determine a loyalty incentive to be provided to a customer using the payment terminal 10 to purchase goods or services from a retailer. During a first visit to the retailer, a customer is provided with a loyalty incentive to be redeemed in a second or subsequent visit to the retailer. Moreover, the behaviour of the graphical user interface engages a customer, effectively gamifying the manner in which loyalty incentives are presented by the payment terminal 10 to the customer. Ideally, the loyalty incentives are presented as part of a game of chance or skill.

It should be noted that a customer need not necessarily return to the same retailer payment terminal—or indeed even the same premises—to redeem a loyalty incentive. A retailer (or those which with a retailer may be affiliated) may have geographically separated premises. Thus, a loyalty incentive provided during a first customer visit at a first retailer location or premises can be redeemed during a second customer visit at another affiliated retailer premises. It should also be noted that affiliated retailers need not belong to the same brand or company.

The application 9 configures the payment terminal 10 to receive, via the keypad, the value of a first customer purchase to be made during a first customer visit to the retailer. For example, a staff member may enter the cost of a meal via the keypad. In alternatives, the payment terminal 10 may receive the value of the first customer purchase in another way. For example the value may be entered via a virtual keypad displayed on the touch-sensitive electronic screen, or otherwise passed to the payment terminal 10 via an independent POS system.

In the embodiments shown in FIGS. 3 to 12, the application is arranged to provide a ‘spin to win’ game. The graphical user interface configuration shown in FIG. 3 is generated in response to receiving the value of the first customer purchase. Specifically, the entered value of the first customer purchase is used by the application to choose one a plurality of predetermined sets of potential loyalty incentives. These are represented on the screen as part of a “spin to win” wheel, with each potential loyalty incentive occupying a segment of the wheel. In FIG. 3, the potential loyalty incentives shown are: £6, a free side, £10, £1, and 0. These potential loyalty incentives may be chosen, for example, in response to receiving a value of between £20 and £30 for the first customer purchase. However, as will be described in further detail below, the potential loyalty incentives that are provided are customisable by the retailer. Additionally, to maximise the engagement of the customer, the most valuable loyalty incentive is located at a prominent position, for example adjacent to a centrally-located pointer icon.

The graphical user interface configuration in FIG. 3 provides two user-selectable options: “Play” and “Redeem Prize”. If the “Play” option is selected, then the application is configured to run a animation sequence on the electronic screen during which the “spin to win” wheel appears to rotate, presenting each of the potential loyalty incentives to the user and moving them adjacent to and past the centrally-located pointer icon along a curved path.

The animation sequence includes an apparent slowing of the wheel and then concludes with one of those potential loyalty incentives being located adjacent to the pointer icon signifying the final selection of the loyalty incentive to be provided to the customer.

In one configuration of the application, there is an equal probability of each potential loyalty incentive being chosen. However, in other configurations, the probabilities may be weighted in a predetermined way. Moreover, the way that one of the potential loyalty incentives are automatically determined to be the loyalty incentive may be customised by the retailer.

FIG. 4 is a screenshot of the graphical user interface configuration displaying a notification of the determination of the £10 loyalty incentive, and FIG. 5 provides instructions about how to redeem the determined loyalty incentive.

To ensure that the loyalty incentive that has been determined is made available to the customer in a subsequent visit (and, if necessary, via a different payment terminal) it is necessary to store certain information at the management server. This information includes the determined loyalty incentive, and a unique identifier that is associated with the customer to which that loyalty incentive was first provided.

Furthermore, the customer is advantageously provided with the unique identifier in a way that obviates the need for the customer to carry additional physical media. This is achieved using the payment card (or other payment instrument) that the customer utilises to conclude the payment transaction for the first customer purchase.

In particular, determining the unique identifier associated with the loyalty incentive comprises interfacing the payment terminal, via the payment instrument interface, with the customer’s payment card to receive from it a payment instrument identifier such as the card number. Whilst the payment card number is often sufficiently unique to suffice for these purposes, for the purpose of security the application may apply a function on the payment instrument identifier to scramble the plaintext card number whilst, at the same time, retaining its uniqueness. For example, a timestamp may be included within the unique identifier and/or the unique identifier may include a payment terminal identifier (or a function thereof) associated with the payment terminal on which said application is running.

Whilst the preferred embodiments utilises retrieving the payment instrument identifier from a payment card via the card reader module 21, it should be understood that other payment instruments may be used, and the payment instrument interfaces 20 of the payment terminal 10 may interact with such alternative payment instruments via different means. For example the payment instrument may be a smart-phone that includes a near-field communication (NFC) device via which data such as the payment instrument identifier is passed to the payment terminal 10 via the contactless payment module 22.

Naturally, the payment instrument interface is also used to conduct a transaction with the payment server 7 in order to conclude the first customer purchase, with the payment instrument interface communicating with the payment server via the wireless communication module 16 and the network 6.

Upon successful completion of the first customer purchase, the application 9 configures the payment terminal 10 to transmit to the management server 4 via one of the telecommunication modules, the determined loyalty incentive and associated unique identifier. The application 9 further configures the printer 14 to issue a voucher **14*a* bearing a representation of the unique identifier, as shown in FIG. 5. It is not essential for the voucher 14*a*** to be printed, but can confer the benefit of allowing a customer to pass the loyalty incentive they have earned to someone else.

The application 9 further configures the payment terminal to determine a validity parameter associated with the determined loyalty incentive, the validity parameter comprising an expiry date and a minimum spend threshold. The determined validity parameter is also transmitted to the management server 4 together with the loyalty incentive and associated unique identifier.

The voucher 14*a* printed by the printer 14 additionally bears a representation of the loyalty incentive, and the validity parameter as depicted by FIG. 5. The voucher 14*a* may be provided as an extension to a standard payment receipt otherwise issued by the payment terminal 10. The issuance of the voucher 14*a* provides a second way for the customer to redeem the determined loyalty incentive, or even pass the loyalty incentive to a third party.

The main way for the customer to redeem the determined loyalty incentive during a second visit to the retailer is, as instructed by FIG. 5, simply to use the payment card (or other payment instrument) that was used to complete the purchase during the first visit to the retailer.

Specifically, during a second visit to the retailer a customer provides that payment instrument to the (or another) payment terminal for the purpose of conducting a second transaction to pay for the second customer purchase. As before, the unique identifier is provided by interfacing the payment terminal, via the payment instrument interface, with the customer's payment card to receive from it a payment instrument identifier (and optionally applying a function to it). The application 9 is then arranged to transmit a redemption request to the management server, the redemption request including that determined unique identifier. The management server uses the unique identifier included within the redemption request to look up whether there is associated with it an unredeemed loyalty incentive. If so, this is sent back to the requesting payment terminal 10 within a redemption response. Thus, when a customer offers their payment card to the payment terminal 10 they can be immediately notified of the availability of a loyalty incentive for redemption as depicted in FIG. 7.

The graphical user interface configuration shown in FIG. 7 provides user options for selection, the first option actioning the redemption of the loyalty incentive as shown in FIG. 8, and the second option keeping the loyalty incentive unredeemed until a further visit. If a customer elects to redeem their loyalty incentive then this is signalled to them by displaying the initial value of the second customer purchase, the value of the loyalty incentive, and a discounted value of the second customer purchase.

Referring back to FIG. 3, if a customer wishes to use the previously issued voucher 14*a* to redeem the loyalty incentive, it is possible to do so by selecting the "Redeem Prize" option. Doing so adopts the graphical user interface configuration shown in FIG. 9 within which the payment terminal 9 is configured to receive the code borne by the voucher 14*a* via a data input means—such as the keypad 15.

Again the unique identifier is sent to the management server within a redemption request to look up whether there is associated with it an unredeemed loyalty incentive. If it is determined that the unique identifier is associated with a loyalty incentive already redeemed then the redemption response sent back from the management server 4 to the payment terminal 10 includes the redemption failure message as shown in FIG. 10 instructing a user that the loyalty incentive has already been redeemed. Other redemption failure messages may be issued under other circumstances. For example, if it is determined that the date of redemption is after the expiry date validity parameter for a particular loyalty incentive, or if the value of the second customer purchase is lower than the minimum spend threshold validity parameter, then an appropriate failure message can be transmitted by the management server 4 to the payment terminal 10 and displayed via an appropriate configuration of the graphical user interface. Accordingly during the second customer visit to the retailer, the successful application of the loyalty incentive is dependent on the validity parameter associated with that loyalty incentive.

Certain loyalty incentives may not be numerical and so may not necessarily be straight-forward for the application to automatically apply against the initial value of the second customer purchase. For example, FIG. 11 shows a loyalty incentive labelled as "cheapest main course". The value of this loyalty incentive may not be automatically available to the payment terminal, especially if there is no integration between an existing POS system of the retailer and the payment terminal. Accordingly it is necessary to manually enter the value of this loyalty incentive, and furthermore for security reasons it is necessary for an authorised user (such as a member of the retailer staff) to enter and apply the value of such a loyalty incentive. Thus, when the payment terminal receives a non-numerical loyalty incentive, the executed application 9 configures the payment terminal 10 to issue an authorisation notification—as shown in FIG. 12—for notifying an authorised user to enter the numerical value equivalent to the non-numerical loyalty incentive and additionally provide a predetermined authorisation code to authorise the application of said manually-entered numerical value equivalent.

Screenshots of an alternative graphical user interface, as generated by an alternative application 9 executed by a payment terminal of the system 1 is shown in FIGS. 13 to 24. Similar functions are provided by this alternative graphical user interface which are self-explanatory when considering these drawings in comparison with the first graphical user interface.

Figure 14:
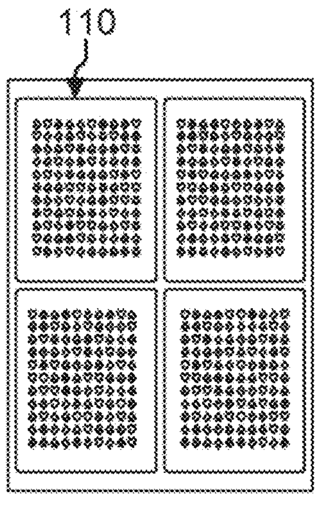
Figure 15:
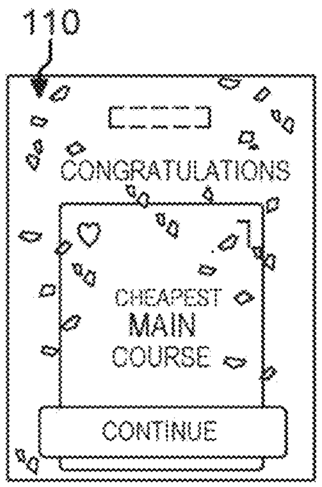
Figure 16:
Figure 17:
Figure 18:
Figure 19:
Figure 20:
Figure 21:
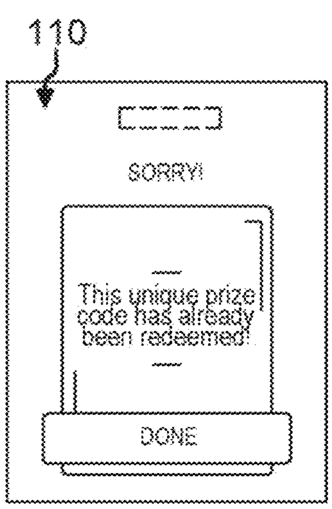
Figure 22:
Figure 23:
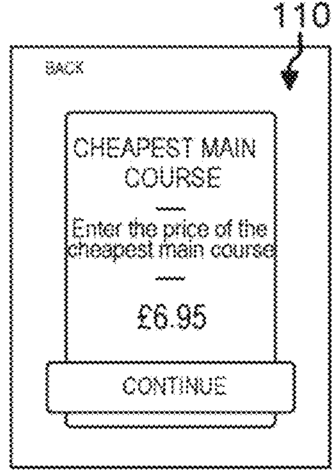
Figure 24:
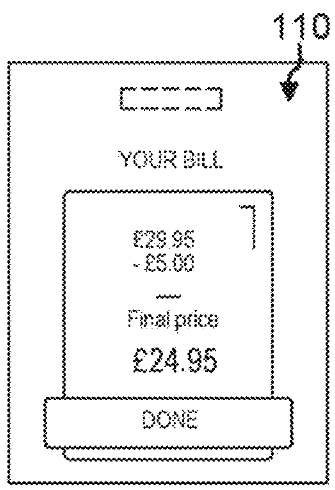

However, rather than providing a "spin to win" game, the alternative application provides a "tap to win" game instead. With reference to FIG. 14, a user can use the electronic touch-sensitive screen of the terminal to select one of the representations of four cards, the reverse face of the which are initially shown. Upon selection, an animation reveals a loyalty incentive on the obverse face of the selected card representation (e.g. FIG. 15, 16 or 17). Instructions are provided via the user interface 110 about how to redeem the loyalty incentive (FIG. 18). On a second customer visit, redemption as shown in FIGS. 19 to 24 is carried out in a manner akin to the corresponding user interface shown in FIGS. 7 to 12.

Screenshots of yet a further graphical user interface, as generated by an alternative application 9 executed by a payment terminal of the system 1 is shown in FIGS. 30 to 33. Again similar functions are provided by this alternative graphical user interface 110 which are self-explanatory when considering these drawings in comparison with the first and second graphical user interface.

However, the alternative application does not always need user interaction to participate in a game. Instead, the alternative application keeps track of a series of customer visits and purchases, and provides the customer with feedback about their progression towards being able to redeem a loyalty incentive. This is akin to a traditional loyalty stamp or punch card implemented using the system 1 according to the present embodiments.

For every customer visit, the payment terminal 10 can use information unique to the payment instrument used to make a purchase, together with a value of a transaction to determine (together with the incentive management server 4) the loyalty incentive. In the graphical user interface shown in FIGS. 30 to 33, a condition of that loyalty incentive is that a customer makes multiple visits and purchases. A first visit is shown in FIG. 30, a fourth (intermediate) visit is shown in FIG. 31. FIG. 32 shown a message on the sixth visit to indicate to a user that a loyalty incentive can be redeemed on the next visit. FIG. 33 is akin to FIGS. 7 and 19, in that an option is provided to the customer to redeem the loyalty incentive. During each visit, feedback is provided to the customer in the form of instructions and progress icons about the conditions and progress towards being able to redeem a loyalty incentive.

In a further alternative to the embodiments described herein, the loyalty incentive and associated unique identifier may not necessarily be chosen or generated by the payment terminal. Rather, these may be sent to the payment terminal from the incentive management server 4. In such an alternative, the payment terminal 10 transmits a request to the incentive management server 4 that, for example, identifies the value of the first customer purchase, and optionally provides an identifier associated with the payment instrument used by the user to pay for the first customer purchase. In response, the incentive management server 4 chooses an appropriate loyalty incentive and sends this (optionally with a further unique identifier associated with the loyalty incentive) back to the payment terminal 10 for display to the customer, and optionally to be the subject of a printer voucher 14*a*.

The appearance and behaviour of the graphical user interface and the operation of the payment terminal 10 in general is predominantly governed by the application that is downloaded from the management server 4. Accordingly, it is possible to provide applications that are customised by a retailer.

To this end the management server 4 is configured to maintain a plurality of retailer user accounts. Each retailer user account permits secure communication with a set of payment terminals belonging to an owner of a respective retailer user account so as to download and/or update a customised version of the application to be executed on each payment terminal of that set. Additionally, retailers can log into the management server 4 to choose customisations for the application.

More specifically, the retailer can use the retailer computing device 5 to establish a secure connection over the network 6 with the management server 4. In response, the management server 4 serves to the retailer computing device 5 a user interface via which the owner of a retailer user account can log in to their account with the management server 4 and control a number of parameters.

Referring to FIGS. 25 to 28, screenshots are shown of the user interface 40 served by the management server 4, and generated at a browser of the retailer computing device 5. The user interface 40 of FIGS. 25 to 28 relate primarily to the customisation of the user interface running on the payment terminal, as shown in FIGS. 3 to 12, relating to the "spin-to-win" game.

Figure 25:
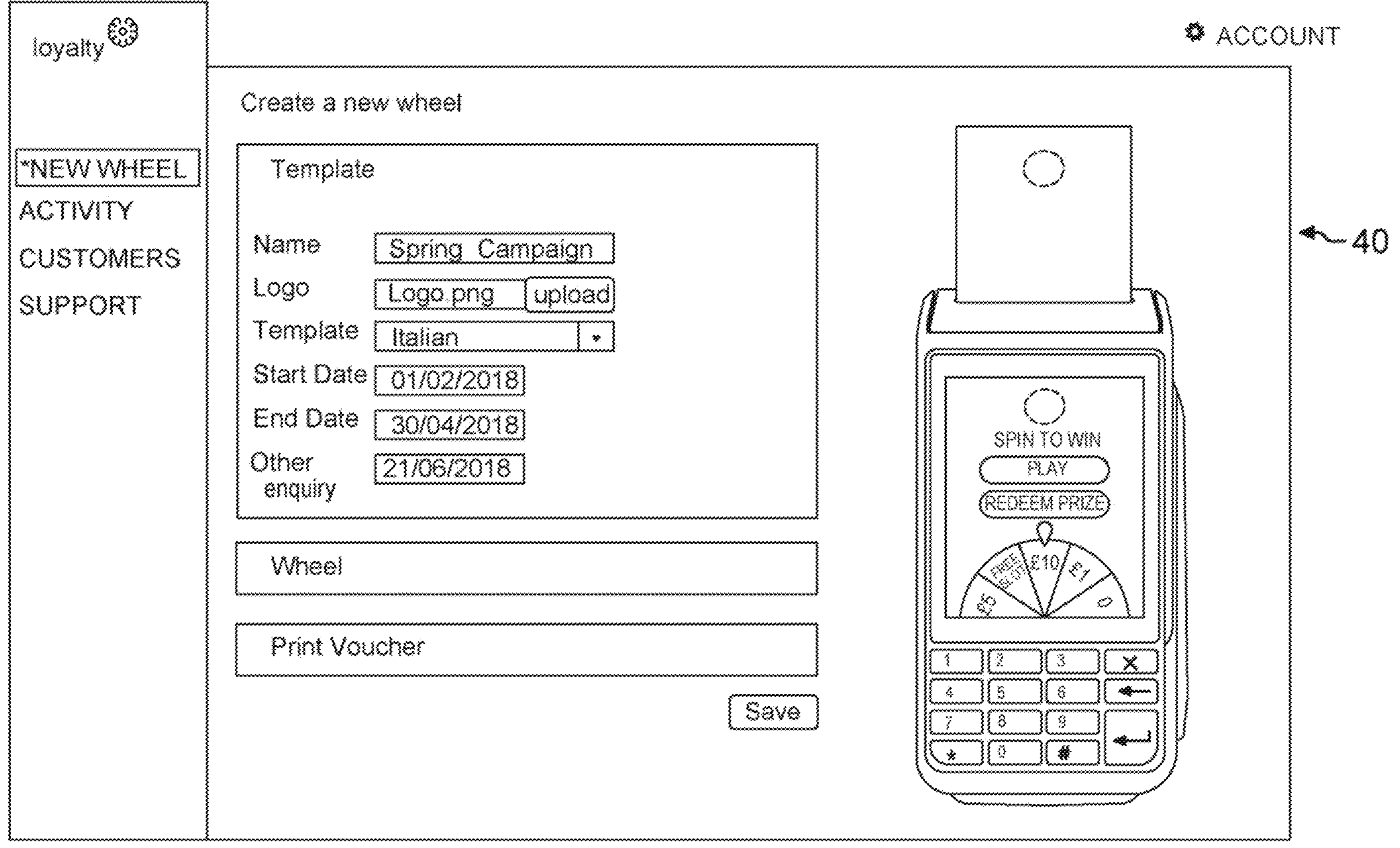
Figure 26:
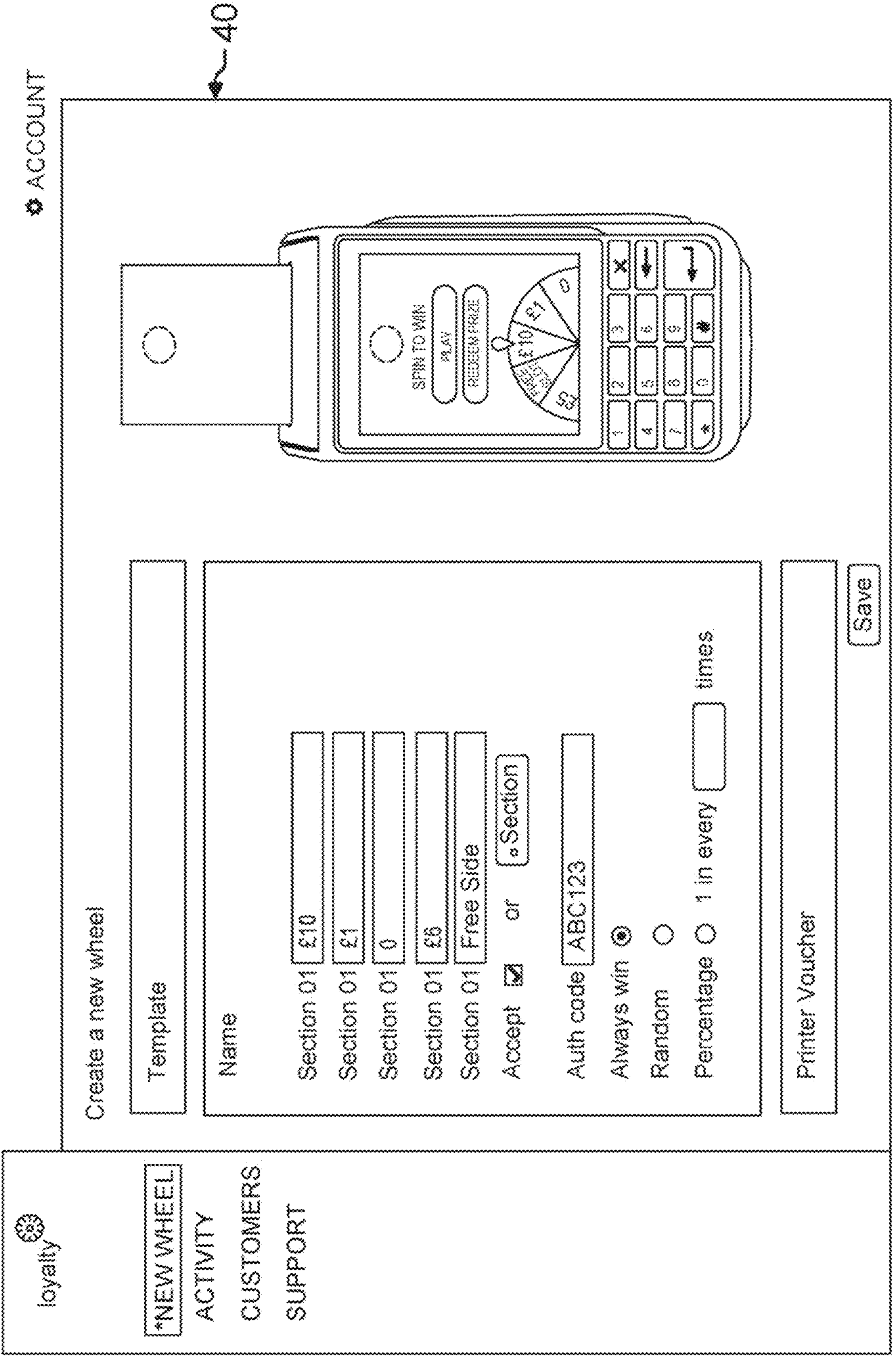

The user interface 40 configuration of FIG. 25 includes a template section via which information can be provided by the retailer to customise the application running at payment terminals associated with the retailer. Additionally, various loyalty incentive campaigns may be set up by retailer. Information that can be provided via the template section includes:

- the name of the campaign;
- a logo image;
- a template for the "spin to win" game;
- a start date for the campaign;
- an end date for the campaign; and/or
- an expiry date for loyalty incentives issued by the payment terminal between the start and end date of the respective campaign The user interface 40 configuration of FIG. 26 includes a wheel section which allows each one of the potential loyalty incentives to be specified by the retailer together with the behaviour associated with determining one of those potential loyalty incentives. For example, determination can be random (e.g. equal probabilities), a non-zero value loyalty incentive could be specified to be always determined, or to be determined as a percentage of the number of times the payment terminal is used.

In extensions of the present embodiment, it is possible to further specify different tiers of customers, with the set of loyalty incentives provided to them, and/or the probability of determining one of those loyal incentives being dependent on the tier. This can be achieved by registering customers with the management server via the unique identifier derived from their payment card, and optionally tiering them in response to the value of their purchases with the retailer.

For example, customers that spending the highest total value with a retailer over a series of visits may be classed as "Gold" tier customers, those that spend the least may be classed as "Bronze" tier customers, and those having an intermediate spend may be classed as "Silver" tier customers.

Thus, when those Gold tier customer use their payment card (or other payment instrument) the payment terminal may present a set of higher value potential loyalty incentives and/or may improve the chance of winning more so than when "Silver" or "Bronze" tier customers use their payment card.

Thus, more generally, it is possible for the owner of a retailer user account to choose and/or specify via the user interface provided by the management server:

- images, such as retailer logos and/or messages to be displayed and/or printed;
- one or more loyalty incentive determination parameters;
- one or more predetermined sets of potential loyalty incentives;
- one or more unique identifier determination parameters; and/or
- one or more authorisation codes.

Figure 27:
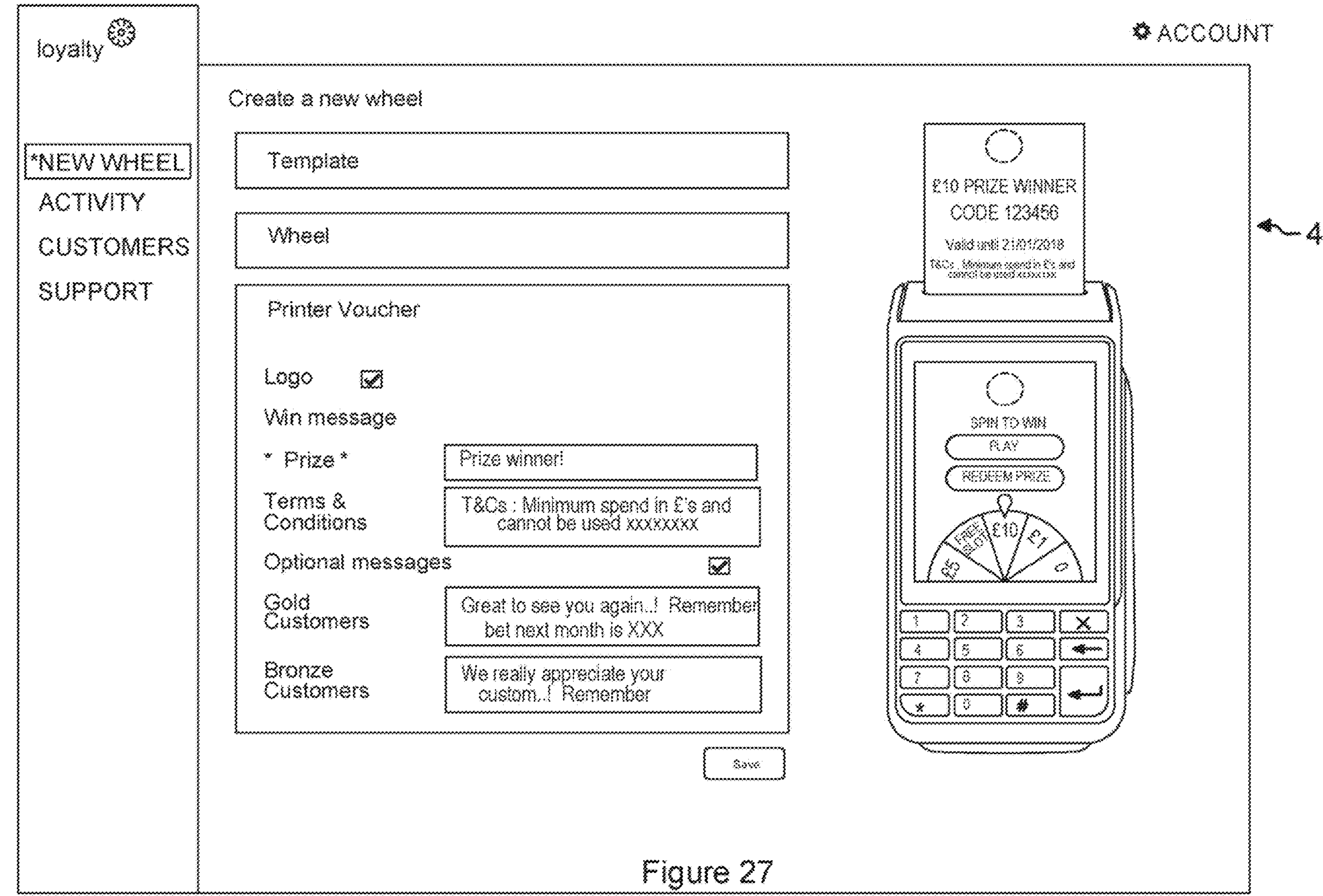

FIG. 27 provides an additional example of the ability to customise, via the user interface 40 provided by the management server, the behaviour of the payment terminal on which the customised application is executed. In particular, it is possible to customise the messages that are printed on the voucher issued by the printer 14 of the payment terminal, with optional messages being included for customers recognised by their payment card (or other payments instrument) as belonging to a predetermined tier.

Following the committing or saving of an update by the retailer, via the user interface 40 provided by the management server, the management server is configured to communicate with the set of payment terminals belonging to the owner of a respective retailer user account so as to download and/or update a customised version of the application to be executed on each payment terminal of that set. Updates may be issued periodically or in response to an authorised user request to update. Furthermore updates maybe pulled from the payment terminals or pushed from the management server to the payment terminals.

In addition to specifying the behaviour of the payment terminals, the management server also allows for the owner of a respective retail user account to view information transmitted between the management server and the set of payment terminals belonging to the owner.

Figure 28:
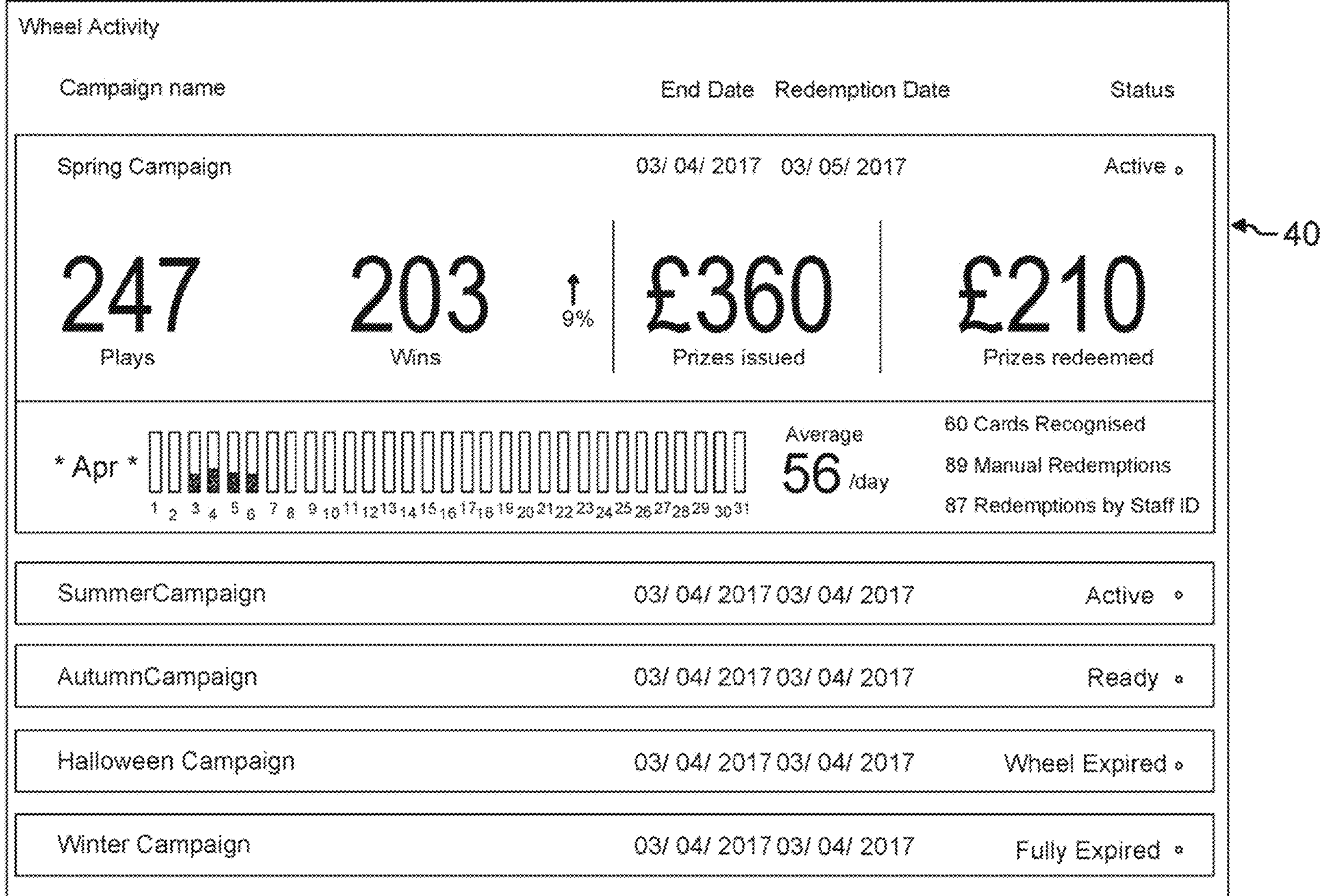

Referring to the user interface 40 configuration of FIGS. 28 and 29, such data may be provided to the retailer computing device 5 from the management server 4, the user interface being arranged to present the data corresponding to:

time, number and/or value of loyalty incentives issued;

time, number and/or value of loyalty incentives redeemed; and/or time and/or number of returning customers.

Furthermore, for ease of user interpretation, the data is presented via the user interface in a visual form including bar graphs or charts, with time as an axis and also with indicia and colours indicating relative values, such as red for low, green for high, up arrow for increase, down arrow for decrease.

Figure 34:
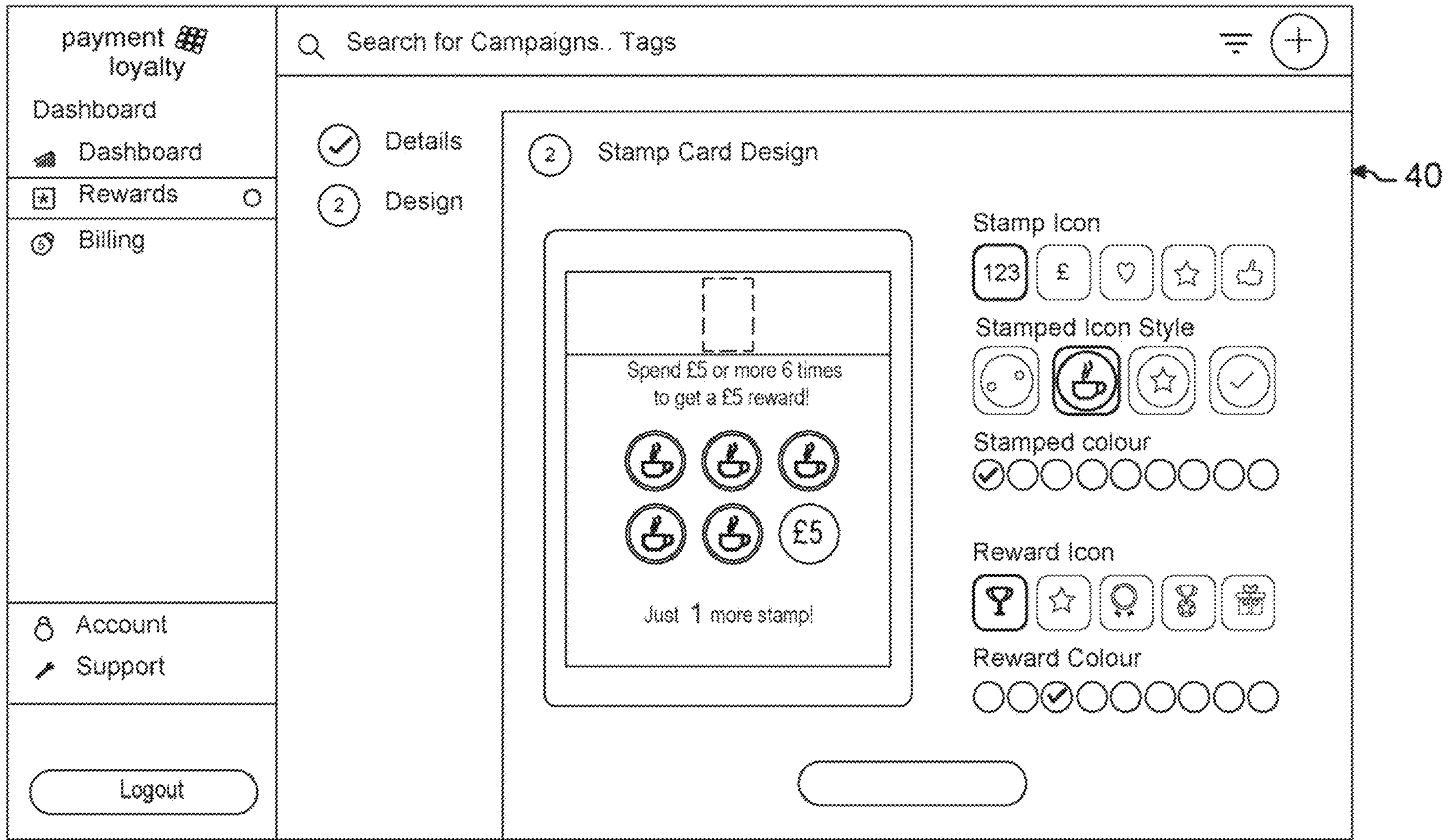
FIG. 34 is a screenshot of an alternative graphical user interface served by a management server of the payment system of FIG. 1, the graphical user interface permitting the configuration of payment terminals of the payment system of FIG. 1 and/or displaying data transmitted by those payment terminals to the management server.

Referring to FIG. 34, another user interface 40 served by the management server 4, and generated at a browser of the retailer computing device 5 is shown. This user interface 40 relates primarily to the customisation of the user interface running on the payment terminal, as shown in FIGS. 30 to 33. As can be seen in FIG. 34, parameters, and user interface components (such as the progress icons shown) can be adjusted in a similar manner as already described.

Although the invention has been described in conjunction with specific embodiments thereof, it is evident that many alternatives, modifications and variations will be apparent to those skilled in the art.

For example, whilst game of chance are provide in relation to the presently described embodiments, it will be understood that a game of skill, played via the user interface of the payment terminal, may be provided instead, the outcome of the game of skill determining a loyalty incentive.

Accordingly, it is intended to embrace all such alternatives, modifications and variations that fall within the scope of the appended claims.

The invention claimed is:

1. An electronic payment system for managing a loyalty incentive scheme, comprising:

a plurality of payment terminals, each including:

an electronic screen for displaying information to a user relating to a payment transaction;

data input means, including at least one payment instrument interface for interfacing with a customer payment instrument, such as a credit card, and receiving payment instrument data therefrom for conducting a payment transaction; and at least one telecommunication module;

a terminal management server for managing the operation of the payment terminals, wherein the terminal management server is configured to maintain a first retailer user account and a second retailer user account, the first retailer user account permitting secure communication with a first set of payment terminals associated with the first retailer user account so as to download a first customized version of an application to be executed on the first set of payment terminals, the first set of payment terminals belonging to an owner of the first retailer user account, the second retailer user account permitting secure communication with a second set of payment terminals associated with the second retailer user account so as to download a second customized version of the application to be executed on the second set of payment terminals, the second set of payment terminals belonging to an owner of the second retailer user account; and an incentive management server for managing incentives to be applied at the payment terminals and for allowing a first loyalty campaign and a second loyalty campaign to be established, configured and maintained, wherein the first loyalty scheme is associated with the first retailer user account and the second loyalty scheme is associated with the second retailer user account; wherein the payment terminals in the first set of payment terminals and the payment terminals in the second set of payment terminals are arranged to communicate, via the at least one telecommunication module, with the terminal management server to download the first customized version of the application and the second customized version of the application, respectively, for execution by the respective payment terminal, the respective one of the first and second customized version of the application configuring the respective payment terminal to:

receive, via the data input means, a value of a first customer purchase to be made during a first customer visit to a retailer;

determine a loyalty incentive, as a function of the respective first and second loyalty scheme, in dependence on the value of the first customer purchase;

interface, via the at least one payment instrument interface, with the customer payment instrument to receive therefrom payment instrument data that is utilized to securely conduct a payment transaction with a payment server to conclude the first customer purchase;

display, on the electronic screen, successful conclusion of the first customer purchase; and determine a unique identifier associated with the loyalty incentive that is derived from the payment instrument data that was utilized to securely conduct the payment transaction with the payment server;

transmit, via the at least one telecommunication module, the loyalty incentive and associated unique identifier between the incentive management server and the payment terminal, wherein the incentive management server is arranged to store the loyalty incentive and its unique identifier, the executed application further configuring the at least one of the payment terminals to:

receive, via the data input means, the unique identifier provided during a second customer visit to the retailer;

transmit, via the at least one telecommunication module, a redemption request to the incentive management server, the redemption request including the unique identifier provided during the second customer visit to the retailer;

receive, via the at least one telecommunication module, a redemption response from the incentive management server, the redemption response comprising the loyalty incentive associated with the unique identifier;

display, via the electronic screen, an initial value of a second customer purchase to be made during the second customer visit to the retailer;

apply the loyalty incentive received as part of the redemption response against the initial value;

display, via the electronic screen, a discounted value of the second customer purchase;

securely conduct a payment transaction with a payment server, via the at least one payment instrument interface, to conclude the second customer purchase; and display, on the electronic screen, as a function of the respective first and second loyalty scheme, successful conclusion of the second customer purchase;

wherein the unique identifier associated with the loyalty incentive is initially determined in response to interfacing with the customer payment instrument to receive therefrom payment instrument data that is utilized to securely conduct the payment transaction with the payment server during a first customer visit;

wherein the payment instrument data that is utilized to securely conduct the payment transaction includes a payment instrument identifier, such as a card number, the unique identifier being generated by applying a function on the payment instrument identifier, wherein the loyalty incentive and the associated unique identifier generated from the payment instrument is first stored at the incentive management server during the first customer visit to the retailer.

2. The payment system of claim 1, wherein determining the loyalty incentive, as a function of the respective first and second loyalty scheme, in dependence on the value of the first customer purchase includes:

choosing one of a plurality of predetermined sets of potential loyalty incentives, the plurality of predetermined sets of potential loyalty incentives being pre-loaded into the application downloaded from the terminal management server; and executing an animation sequence on the electronic screen during which each member of the chosen set of potential loyalty incentives are represented on the electronic screen, the animation sequence concluding with one of those members being identified by a respective representation as the determined loyalty incentive.

3. The payment system of claim 2, wherein the animation sequence displays only a sub-set of the representations of the potential loyalty incentives on the electronic screen at any one time:

the animation sequence includes moving the representations of the chosen set of potential loyalty incentives along a movement path starting at a first screen boundary, and ending at a second screen boundary; and the movement path is curved.

4. The payment system of claim 1, wherein the first and second customized versions of the application further configures the respective payment terminals to:

determine, during the first customer visit to the respective retailer, a validity parameter associated with the determined loyalty incentive; and transmit the validity parameter together with the loyalty incentive and associated unique identifier to the incentive management server for storage; wherein, during the second customer visit to the retailer, application of the loyalty incentive is dependent on the validity parameter; wherein the validity parameter comprises an expiry date, and application of the loyalty incentive is dependent on the date of redemption not being after the expiry date; and the validity parameter comprises a minimum spend threshold, and application of the loyalty incentive is dependent on the initial value of the second customer purchase not being lower than the minimum spend threshold.

5. The payment system of claim 1, wherein an authorisation code is loaded into the first and second customized versions of the application, the first and second customized versions of the application further configuring the respective payment terminals to issue an authorisation notification for notifying an authorised user, such as retailer staff to provide the authorisation code, application of the loyalty incentive being dependent on the correct authorisation code being provided via the data input means in response to the authorisation notification.

6. The payment system of claim 1, wherein the loyalty incentive includes at least one of:

a numerical parameter, such as a value or percentage, the discounted value of the second customer purchase being automatically calculated by the executed application; and a non-numerical parameter, such as an instruction, the executed application being arranged to display to an authorised user the non-numerical parameter and in response is arranged to receive from the authorised user, via the data input means, a numerical value associated with the non-numerical parameter.

7. The payment system of claim 1, wherein the payment terminals each include a token generator, such as a printer, for issuing a physical token such as a voucher, the first and second customized versions of the application further configuring the respective payment terminals to issue a physical token in response to successful conclusion of the first customer purchase, the physical token bearing a representation of at least one of: the unique identifier, the loyalty incentive and a validity parameter.

8. The payment system of claim 1, wherein the data input means comprises includes at least one of a virtual keypad displayed on the electronic screen of the payment terminal, and a physical keypad, wherein receiving the value of the first customer purchase comprises receiving a user interaction with at the at least one keypad to provide the value to the payment terminal.

9. The payment system of claim 1, wherein the at least one payment instrument interface comprises at least one of a card chip reader, a card slot and a contactless payment transceiver.

10. The payment system of claim 1, wherein at least one of the payment terminals is arranged to issue an update request to the terminal management server, and in response receive an update of the application to be executed.

11. The payment system of claim 1, wherein the first and second customized versions of the application includes at least one of:

images to be displayed;

at least one loyalty incentive determination parameter;

at least one predetermined set of potential loyalty incentives:

at least one unique identifier determination parameter; and at least one authorisation code;

specified by the owner of the respective retailer user account.

12. The payment system of claim 11, wherein the terminal management server is arranged to establish a secure connection with a retailer computing device, and serve thereto a user interface via which an owner of a retailer user account can choose at least one of:

images to be displayed;

at least one loyalty incentive determination parameter;

at least one predetermined set of potential loyalty incentives;

at least one unique identifier determination parameter; and at least one authorisation code;

specified by the owner of the respective retailer user account.

13. The payment system of claim 1, wherein the incentive management server is configured to maintain the first and second retailer user accounts, each retailer user account:

permitting secure communication with a set of payment terminals belonging to an owner of a respective retailer user account; and granting access to data previously transmitted by payment terminals of that set to the incentive management server, and stored thereat.

14. The payment system of claim 13, wherein the incentive management server is arranged to establish a secure connection with a retailer computing device, and serve thereto a user interface via which an owner of a retailer user account can view the data previously transmitted by the set of payment terminals belonging to that owner.

15. The payment system of claim 14, wherein the user interface is arranged to present the data corresponding to at least one of:

value of loyalty incentives issued; and value of loyalty incentives redeemed.

16. The payment system of claim 1, wherein the first and second customized versions of the application further configures the payment terminals to:

during an intermediate customer visit to the retailer, receive, via the data input means, the unique identifier associated with a loyalty incentive;

securely conduct a payment transaction with the payment server, via the at least one payment instrument interface, to conclude an intermediate customer purchase;

transmit, via the at least one telecommunication module, a status update request to the incentive management server, the status update request including the unique identifier;

receive, via the at least one telecommunication module, a status update response from the incentive management server, the status update response comprising an updated status of condition parameters associated with the unique identifier and loyalty incentive; and display, via the electronic screen, a representation of the status of the condition parameters associated with the unique identifier.

* * * * *